United States Patent
Li et al.

(10) Patent No.: US 11,370,707 B1
(45) Date of Patent: Jun. 28, 2022

(54) ASPHALT MODIFIED WITH RED MUD FOR POROUS PAVEMENT MATERIAL AND APPLICATION THEREOF

(71) Applicant: Tongji University, Shanghai (CN)

(72) Inventors: Hui Li, Shanghai (CN); Ming Jia, Shanghai (CN); Hengji Zhang, Shanghai (CN); Ning Xie, Shanghai (CN); Jiawen Liu, Shanghai (CN)

(73) Assignee: Tongji University

( * ) Notice: Subject to any disclaimer, the term of this patent is extended or adjusted under 35 U.S.C. 154(b) by 0 days.

(21) Appl. No.: 17/367,889

(22) Filed: Jul. 6, 2021

(30) Foreign Application Priority Data

Mar. 23, 2021 (CN) .......................... 202110307588.5

(51) Int. Cl.
  *C04B 26/26* (2006.01)
  *C04B 18/04* (2006.01)
  *C04B 38/00* (2006.01)

(52) U.S. Cl.
  CPC .......... *C04B 26/26* (2013.01); *C04B 2201/10* (2013.01); *C04B 2201/20* (2013.01)

(58) Field of Classification Search
  CPC .. C04B 2201/10; C04B 2201/20; C04B 26/26
  See application file for complete search history.

(56) References Cited

FOREIGN PATENT DOCUMENTS

| CN | 105753375 A | * | 7/2016 | |
|---|---|---|---|---|
| CN | 107722649 A | * | 2/2018 | |
| CN | 111085107 A | | 5/2020 | |
| GB | 2366567 A | * | 3/2002 | .............. C08L 95/00 |

OTHER PUBLICATIONS

CN-105753375-A (Year: 2016).*
CN-107722649-A translation (Year: 2018).*

* cited by examiner

*Primary Examiner* — Shuangyi Abu Ali
(74) *Attorney, Agent, or Firm* — Maschoff Brennan; Jonathan M. Benns

(57) ABSTRACT

The present disclosure provides asphalt modified red mud for porous pavement material and an application thereof. The porous asphalt pavement material includes asphalt, red mud and aggregate; the mass ratio of asphalt to red mud is 1:(0.10-0.15), the mass ratio of the total mass of asphalt and red mud to aggregate is (0.08-0.12):1. With regard to the asphalt modified with red mud for porous pavement material provided in the present disclosure, asphalt is modified with red mud, and aggregate is added to synergize with red mud so as to improve the purification properties and mechanical properties of the porous asphalt pavement material efficiently. In the embodiments of the present disclosure, the purification rate of suspended matter by the asphalt modified with red mud for porous pavement material reaches 54.9-58.6%, and the purification rate of heavy metals (iron and lead) reaches 34.3-46.1%.

18 Claims, 5 Drawing Sheets

ASPHALT MODIFIED WITH RED MUD FOR POROUS PAVEMENT MATERIAL AND APPLICATION THEREOF

CROSS REFERENCE TO RELATED APPLICATION(S)

This patent application claims the benefit and priority of Chinese Patent Application No. 202110307588.5, filed on Mar. 23, 2021, the disclosure of which is incorporated by reference herein in its entirety as part of the present application.

TECHNICAL FIELD

The present disclosure relates to the technical field of asphalt pavement materials, and specifically relates to asphalt modified with red mud for porous pavement material and application thereof.

BACKGROUND ART

As a result of industrial waste gas and traffic exhaust emissions, snow-melting agent spreading, atmospheric sedimentation and other reasons, a large amount of pollutants accumulate on the urban surface. During the rainfall or sprinkler operation, most of the pollutants are carried by water flow to form surface runoff, which flows into the surrounding rivers or infiltrates into soil and underground water, thus causing environmental pollution. Porous permeable asphalt pavement has a large amount of pore structures, which can entrap and absorb certain pollutants as water flows through, thereby generating a certain purification effect. However, the purification effect is limited in normal permeable asphalt pavement, and hardly meets the purification requirements for pollutants from road runoff. Therefore, it is necessary to specially add catalysts to degrade the pollutants. For example, the Publication No. CN111085107A disclosed "A method of purifying automobile exhaust by a porous asphalt pavement loaded with composite modified photocatalyst", in which porous carbon molecular sieves and copper-carbon nanotubes are simultaneously added and then co-doped $TiO_2$ is used as the catalyst to prepare a porous asphalt pavement material, which can effectively degrade the pollutants from automobile exhaust. However, due to the high cost, complex process and low durability, this solution is difficult to be used in road construction on a large scale.

Moreover, if the asphalt material is required to meet the road performance under the condition of porous structure, the mechanical properties of the asphalt mortar would be required to be higher, otherwise the porous structure of the porous asphalt tends to block under the pressure of vehicles, so it is not only difficult to play the role of porous filtration, but also more ruts and pits would be formed, even cracking or collapsing in severe cases. At present, the main method to improve the anti-rutting performance of the porous asphalt pavement is to add binders, for example, resin. Although the addition of resin can improve the mechanical properties of the porous asphalt pavement to some extent, the resin components of the pavement are easy to age in outdoor environment for a long time, and the stability of the pavement will be reduced after high temperature exposure in summer.

Therefore, it is necessary to provide a porous asphalt pavement material with superior purification properties and high mechanical properties, so that it can have a better application prospect in road construction.

SUMMARY

The present disclosure is intended to provide asphalt modified with red mud for porous pavement material and an application thereof. The asphalt pavement material of the present disclosure has a good purification effect on pollutants after adding red mud, and can effectively prevent pollutants carried by road rainwater runoff from flowing into rivers, soil and underground water and causing pollution. Moreover, the asphalt pavement material of the present disclosure has superior mechanical properties with respect to traditional pavement materials.

To achieve the above inventive purpose, the present disclosure provides the following technical solutions:

The present disclosure provides asphalt modified with red mud for porous pavement material, including asphalt, red mud and aggregate. The mass ratio of asphalt to red mud is 1:(0.10-0.15), and the mass ratio of the total mass of asphalt and red mud to aggregate is (0.08-0.12):1.

Preferably, the asphalt is high-viscosity asphalt, and the viscosity of the high-viscosity asphalt is greater than 20,000 Pa·s.

Preferably, the particle size of the red mud is 1-75 μm.

Preferably, the density of the red mud is 2.70-2.98 g/cm³.

Preferably, the plasticity index of the red mud is 17-30.

Preferably, the red mud includes the following mass percentages of oxide components: $Al_2O_3$ 21-39%, $Fe_2O_3$ 10-21%, $TiO_2$ 2-5%, $SiO_2$ 16-29%, CaO 13-21% and $Na_2O$ 5-13%.

Preferably, the aggregate is basalt.

Preferably, the gradation way of the aggregate is gap gradation, and the particle size distribution of the gap gradation is less than or equal to 16 mm.

The present disclosure further provides an application of the red mud modified porous asphalt pavement material in the above technical solution, of which the method includes: paving, compacting and resting the red mud modified porous asphalt pavement material in turn, to construct the red mud modified porous asphalt pavement.

Preferably, the rest period is 4-12 h.

The present disclosure provides asphalt modified with red mud for porous pavement material, including asphalt, red mud and aggregate; the mass ratio of asphalt to red mud is 1:(0.10-0.15), the mass ratio of the total mass of asphalt and red mud to aggregate is (0.08-0.12):1. With regard to the asphalt modified with red mud for porous pavement material provided in the present disclosure, asphalt is modified by red mud with abundant pore structures and high specific surface area, enabling the porous asphalt pavement material to have an excellent absorption effect on road runoff pollutants. At the same time, the high specific surface area of red mud narrows the pore channels of the porous asphalt pavement material, so that the particles are closer together, and the friction is enhanced, thereby effectively improving the mechanical properties, anti-dispersion performance and stability of the porous asphalt pavement material. Moreover, red mud is rich in iron, aluminum, sodium, potassium and other elements, from which alkaline substances will be formed under the action of rainwater so that the runoff pollutants can be precipitated effectively, in which $Fe^{3+}$ and $Al^{3+}$ can be precipitated by complexation with $PO_4^{3-}$, $Na^+$ and $K^+$ can exchange with $NH_4^+$, thereby effectively reducing the pollution of phosphorus and nitrogen in the runoff pollutants. In addition, in the present disclosure, aggregate is added to synergize with red mud so as to produce filtering effects on the sediments, absorb and entrap more pollutants, thereby further improving the purification properties of the porous asphalt pavement material. Aggregate is used as the skeleton material, which can improve the anti-splitting strength of the porous asphalt material effectively, thereby further improving the mechanical properties of the porous asphalt pavement material.

It is demonstrated from the results of embodiments that, the purification rate of suspended matter by the asphalt modified with red mud for porous pavement material provided in the present disclosure reaches 54.9-58.6%, the purification rate of heavy metals (iron and lead) reaches 34.3-46.1%, and the purification rate of biochemical pollutants (chemical oxygen demand, total phosphorus and total nitrogen) reaches 30.5-52.1%. The standard dispersion rate at rotational dispersion times from 300 to 1300 is between 5-35%. The improving rate of anti-dispersion is within a range of 30-40%. For the porous asphalt pavement material added with red mud, the rutting depths within 20,000 times of loading do not exceed 7.2 mm, and the improving rate of dynamic stability reaches up to 35%. The peak load can reach 1.5 kN, the splitting strength before freezing-thawing can reach 0.79-0.83 MPa, and it still can reach 0.71-0.73 MPa after freezing-thawing. The flexibility index can reach 106-111. Therefore, the asphalt modified with red mud for porous pavement material provided in the present disclosure has excellent purification properties and mechanical properties.

BRIEF DESCRIPTION OF THE DRAWINGS

FIG. 4(a) strength before and after freezing-thawing; FIG. 4(b) improving rate of strength before and after freezing-thawing.

FIG. 5(a) aging dispersion rate; FIG. 5(b) improving rate of the aging dispersion rate.

DETAILED DESCRIPTION OF THE EMBODIMENTS

Figure 1:
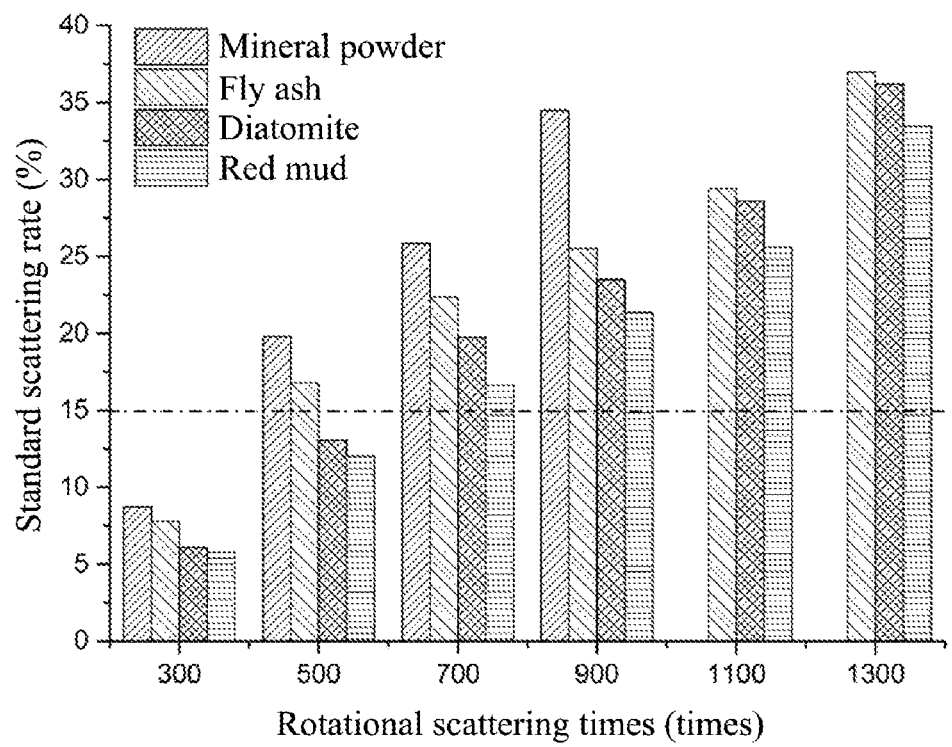
FIG. 1 is a diagram showing the standard dispersion test results of porous asphalt pavement materials in embodiment 1 and comparative embodiments 1-3 of the present disclosure.

The present disclosure provides asphalt modified with red mud for porous pavement material, including asphalt, red mud and aggregate; the mass ratio of asphalt to red mud is 1:(0.10-0.15), and the mass ratio of the total mass of asphalt and red mud to aggregate is (0.08-0.12):1.

The asphalt modified with red mud for porous pavement material provided in the present disclosure includes asphalt. In the present disclosure, the asphalt is preferably high-viscosity asphalt, and the viscosity of the high-viscosity asphalt is preferably greater than 20,000 Pa·s, more preferably greater than 21000 Pa·s, most preferably greater than 22,000 Pa·s. In the present disclosure, high-viscosity asphalt is selected so as to better bind red mud and aggregate, the material system is not prone to disperse, and the prepared asphalt pavement material has higher flexibility and rebound resilience after paving the road, so that it can effectively prevent the porous structure from collapsing under the vehicle loads, and it has stronger rutting resistance and is not easy to crack.

The asphalt modified with red mud for porous pavement material provided in the present disclosure includes red mud. In the present disclosure, the source of red mud is preferably Bayer red mud. The density of red mud is preferably 2.70-2.98 g/cm$^3$, more preferably 2.80-2.90 g/cm$^3$. The plasticity index of red mud is preferably 17-30, more preferably 20-28. The liquidity index of red mud is preferably 0.92-3.37, more preferably 1.00-3.00. By selecting the density, the plasticity index and the liquidity index of red mud, the present disclosure can ensure that the red mud has higher compactness and stability, and red mud and asphalt can be better dispersed into a high-viscosity asphalt system. This is more conducive to getting a uniform porous asphalt pavement material and a better compacting effect, thereby obtaining higher anti-dispersion performance and stability.

In the present disclosure, the particle size of the red mud is preferably 1-75 μm, more preferably 10-65 μm, most preferably 20-55 μm. In the present disclosure, red mud with small particle sizes is used so as to better fill the pore of the aggregate skeleton, so that the particles are closer together, and the friction is enhanced, thereby effectively improving the mechanical properties, anti-dispersion performance and stability of the porous asphalt pavement material. The red mud with small particle sizes has high specific surface area and abundant pores, so it can improve the absorption of pavement pollutants by the porous asphalt pavement material.

In the present disclosure, the red mud preferably includes the following mass percentages of oxide components: $Al_2O_3$ 21-39%, $Fe_2O_3$ 10-21%, $TiO_2$ 2-5%, $SiO_2$ 16-29%, CaO 13-21% and $Na_2O$ 5-13%. More preferably, it includes the following mass percentages of oxide components: $Al_2O_3$ 24-39%, $Fe_2O_3$ 13-21%, $TiO_2$ 3-5%, $SiO_2$ 21-29%, CaO 16-21% and $Na_2O$ 8-13%. In the present disclosure, asphalt is modified by red mud containing the above components, in which there are abundant iron, aluminum, sodium, potassium and other elements, they will form alkaline substances under the action of rainwater so that the runoff pollutants can be precipitated effectively, where $Fe^{3+}$ and $Al^{3+}$ can be precipitated by complexation with $PO_4^{3-}$, $Na^+$ and $K^+$ can exchange with $NH_4^+$, thereby effectively reducing the pollution of phosphorus and nitrogen in the runoff pollutants, and improving the purification properties of the asphalt pavement material.

In the present disclosure, the mass ratio of asphalt to red mud is 1:(0.10-0.15), preferably 1:(0.12-0.15), more preferably 1:(0.13-0.15). By adjusting the proportion of asphalt to red mud, the present disclosure can reduce the using amount of asphalt, thereby realizing the recycling of red mud solid waste; at the same time, asphalt and red mud in the above proportion allow the system to form a more abundant porous structure, and red mud also has good cementation effect, which can improve the purification properties and mechanical properties of the asphalt pavement material effectively.

The asphalt modified with red mud for porous pavement material provided in the present disclosure includes aggregate. In the present disclosure, the aggregate is preferably basalt. By selecting basalt as the aggregate, the present disclosure can effectively improve the strength of the asphalt pavement material, thereby improving the rutting resistance of the pavement.

In the present disclosure, the gradation way of the aggregate is preferably gap gradation, and the particle size distribution of the gap gradation is preferably less than or equal to 16 mm, more preferably: based on the mass percentage of the total screening of the aggregate, the aggregate passing rate corresponding to a screen size of 0.075 mm is 4-6%, the aggregate passing rate corresponding to a screen size of 0.15 mm is 6-7%, the aggregate passing rate corresponding to a screen size of 0.3 mm is 7.5-8.5%, the aggregate passing rate corresponding to a screen size of 0.6 mm is 10-11%, the aggregate passing rate corresponding to a screen size of 1.18 mm is 12-13%, the aggregate passing rate corresponding to a screen size of 2.36 mm is 14-15%, the aggregate passing rate corresponding to a screen size of 4.75 mm is 19-20%, the aggregate passing rate corresponding to a screen size of 9.5 mm is 73-75%, the aggregate passing rate corresponding to a screen size of 13.2 mm is 95-96%, the aggregate passing rate corresponding to a screen size of 16 mm is 100%. In the present disclosure, by selecting basalt of the above gap gradation, large voids can be formed when basalt particles of different particle sizes are accumulated, forming a skeleton-pore structure, thereby improving the permeable water purification performance of the porous pavement.

In the present disclosure, the mass ratio of the total mass of asphalt and red mud to aggregate is (0.08-0.12):1, preferably (0.08-0.10):1, more preferably (0.08-0.09):1. By adjusting the mass ratio of the total mass of asphalt and red mud to aggregate, the skeleton structure formed from the aggregate can bind to the cementation system formed from asphalt and red mud closely, forming a dense porous network, which can not only improve the mechanical properties of the asphalt pavement material effectively, but also improve the entrapping and absorption of pavement pollutants by the porous asphalt pavement material.

With regard to the asphalt modified with red mud for porous pavement material provided in the present disclosure, asphalt is modified with red mud, and aggregate is added to synergize with red mud so as to not only absorb and entrap the pollutants in the pavement runoff and degrade them, thus improving the purification properties of the porous asphalt pavement material, and also making the porous asphalt pavement material to have excellent mechanical properties.

The present disclosure has no special limitation on the construction method of the asphalt modified with red mud for porous pavement material, and standard construction methods can be used according to guidelines of asphalt pavement. In the present disclosure, the preparation method of the porous asphalt pavement material preferably includes: mixing asphalt and red mud to get red mud modified asphalt mortar, then mixing the red mud modified asphalt mortar and aggregate to get the porous asphalt pavement material.

In the present disclosure, the asphalt is preferably melted before mixing; the melting temperature is preferably 160-175° C., more preferably 170-175° C. In the present disclosure, by melting the asphalt, it may have a better fluidity, which is more conducive to mixing it with red mud and aggregate evenly, and the pavement would be smoother during the paving process of road.

In the present disclosure, the red mud and the aggregate are preferably dried before mixing. The drying temperature is preferably 160-175° C., more preferably 170-175° C. The drying period is preferably 55-65 min, more preferably 60-65 min. In the present disclosure, by drying red mud and aggregate, it is more conducive to the bonding of molten asphalt to red mud and aggregate, at the same time, it can avoid the damage of porous structure caused by the evaporation of water after road paving as well as the cracking problem caused by drying and shrinkage, which are more conducive to improving the purification properties and mechanical properties of the porous asphalt pavement material.

The mixing operations of asphalt, red mud and aggregate in the present disclosure are preferably performed according to Standard Test Methods of Bitumen and Bituminous Mixtures for Highway Engineering (JTG E20-2011) until they are mixed evenly to get the porous asphalt pavement material.

The present disclosure further provides an application of the asphalt modified with red mud for porous pavement material in the above technical solution, of which the method includes: paving, compacting and resting the asphalt modified with red mud for porous pavement material in turn, to construct the red mud modified porous asphalt pavement.

In the present disclosure, the asphalt modified with red mud for porous pavement material is paved to get red mud modified porous asphalt pavement to be compacted.

The present disclosure has no special requirements on the paving operations, and normal standard paving methods are suitable for red mud modified porous asphalt pavement.

After obtaining the red mud modified porous asphalt pavement to be compacted, it is compacted in the present disclosure to construct the red mud modified porous asphalt pavement to be dried.

The present disclosure has no special requirements on the compacting operations, as long as compacting with road compactors well known in the art following the road construction specifications.

After obtaining the porous asphalt pavement to be dried, the asphalt modified with red mud for porous pavement material to be dried is rested in the present disclosure to construct the red mud modified porous asphalt pavement.

In the present disclosure, the rest period is preferably 4-12 h, more preferably 6-11 h, most preferably 8-10 h. In the present disclosure, by resting the porous asphalt pavement to be dried, the molten asphalt can be cooled to room temperature and restored to a solid state, then be used after meeting the requirements on the mechanical properties of pavement, thereby avoiding rutting caused by incomplete hardening of the porous asphalt pavement material due to premature loading.

The application method of the asphalt modified with red mud for porous pavement material of the present disclosure is more conducive to obtaining porous asphalt pavement with good purification properties and excellent mechanical properties, and the process is simple and easy to operate, and has good economic and social benefits.

The technical solutions of the present disclosure will be described clearly and completely in combination with the following embodiments of the present disclosure. Obviously, the described embodiments are only a part of embodiments of the present disclosure, rather than all the embodiments. Based on the embodiments in the present disclosure, all other embodiments attained by those with ordinary skills in the art without creative labors are covered within the protection scope of the present disclosure.

Embodiment 1

In this embodiment, the asphalt modified with red mud for porous pavement material is composed of asphalt, red mud and aggregate; the mass ratio of asphalt to red mud is 1:0.10, the mass ratio of the total mass of asphalt and red mud to aggregate is 0.08:1.

The asphalt used in this embodiment is high-viscosity asphalt with a viscosity of 20,000 Pa·s;

The red mud used in this embodiment is Bayer red mud with a particle size of 10-60 μm, with specific indexes as shown in Table 1 below.

TABLE 1

Physical indexes of red mud

| No. | Physical indexes | Index values |
|---|---|---|
| 1 | Density (g/cm$^3$) | 2.75-2.85 |
| 2 | Plasticity index | 20-25 |
| 3 | Liquidity index | 1.00-2.00 |

The specific composition of red mud in this embodiment is shown in Table 2 below:

TABLE 2

Ratio of oxides to the total mass of red mud

| Red mud components | $Al_2O_3$ | $Fe_2O_3$ | $TiO_2$ | $SiO_2$ | CaO | $Na_2O$ |
|---|---|---|---|---|---|---|
| Content (wt %) | 24 | 12 | 4 | 18 | 15 | 5 |

The aggregate used in this embodiment is basalt of gap gradation, the gap gradation is shown in Table 3 below (with the passing rate based on the mass percentage of the total screening of the aggregate):

TABLE 3

Gap gradation of aggregate

| Screen size (mm) | 0.075 | 0.15 | 0.3 | 0.6 | 1.18 | 2.36 | 4.75 | 9.5 | 13.2 | 16 |
|---|---|---|---|---|---|---|---|---|---|---|
| Passing rate (wt %) | 5 | 6.8 | 8 | 10.2 | 12.6 | 14.3 | 19.5 | 74 | 95.6 | 100 |

The preparation method of the asphalt modified with red mud for porous pavement material in this embodiment of the present disclosure specifically included the following steps:

(1) Asphalt was melted at a temperature of 175° C. to get molten asphalt; red mud and aggregate were dried at temperature of 170° C. for 60 min to get dried red mud and aggregate;

(2) The molten asphalt and dried red mud and aggregate obtained from step (1) were mixed evenly according to Standard Test Methods of Bitumen and Bituminous Mixtures for Highway Engineering (JTG E20-2011), to construct the asphalt modified with red mud for porous pavement material.

Embodiment 2

In this embodiment, the mass ratio of asphalt to red mud in embodiment 1 was replaced to 1:0.12, and other technical features were all the same as those in embodiment 1.

Embodiment 3

In this embodiment, the mass ratio of the total mass of asphalt and red mud to aggregate in embodiment 1 was replaced to 0.10:1, and other technical features were all the same as those in embodiment 1.

Embodiment 4

In this embodiment, the red mud used in embodiment 1 was replaced to Bayer red mud with a particle size of 20-70 μm, and other technical features were all the same as those in embodiment 1.

Embodiment 5

In this embodiment, the mass ratio of the total mass of asphalt and red mud to aggregate in embodiment 1 was replaced to 0.12:1, and other technical features were all the same as those in embodiment 1.

Comparative Embodiment 1

In this comparative embodiment, the red mud used in embodiments was replaced with conventional limestone mineral powder, where the mass ratio of asphalt to limestone mineral powder, the mass ratio of the total mass of asphalt and limestone mineral powder to aggregate as well as the preparation process were all the same as those in embodiment 1.

Comparative Embodiment 2

In this comparative embodiment, the red mud used in embodiments was replaced with fly ash, where the mass ratio of asphalt to fly ash, the mass ratio of the total mass of asphalt and fly ash to aggregate as well as the preparation process were all the same as those in embodiment 1.

Comparative Embodiment 3

In this comparative embodiment, the red mud used in embodiments was replaced with diatomite, where the mass ratio of asphalt to diatomite, the mass ratio of the total mass of asphalt and diatomite to aggregate as well as the preparation process were all the same as those in embodiment 1.

Performance Test:

In the present disclosure, the asphalt modified with red mud for porous pavement material samples obtained in embodiments 1-5 and comparative embodiments 1-3 were tested for simulation application in the laboratory according to Standard Test Methods of Bitumen and Bituminous Mixtures for Highway Engineering (JTG E20-2011), in which asphalt, red mud and aggregate were firstly mixed well in proportion in a mixing pan, then successively placed into a Marshall cylindrical mould, compacted, and then taken out and rested for 24 h, getting the red mud modified porous asphalt pavement test samples, which were then tested for the purification properties and mechanical properties in the laboratory, the testing conditions and processes as well as the test results were as below:

1. Test on Purification Properties:

The porous asphalt pavement specimens obtained in embodiments 1-5 and comparative embodiments 1-3 of the present disclosure were placed into a rainfall simulation equipment; rainfall was simulated with the rainfall equipment at a rate of 200 mL/min and sprayed on the upper surface of the specimens evenly, the filtered water samples were collected at the bottom of the specimens and stored in sampling bottles, and kept at 4° C., which were used for the later test of water purifying effect.

The method of water purifying effect test for porous asphalt pavement specimens from embodiments 1-5 and comparative embodiments 1-3 of the present disclosure was shown in Table 4. Various contents in the rainwater before and after purification were determined using HACH-DR3900 spectrophotometer equipment, and the turbidity and the suspended solid content of the rainwater before and after purification were measured using a HACH-2100Q turbidimeter. The purification rate of pollutants was calculated by dividing the measured difference by the concentration of pollutants in the original rainwater.

TABLE 4

| Experimental basis of purification property test | |
|---|---|
| Pollutant Indicators | Reference Standard |
| Suspended matter | GB13200-1991 |
| Biochemical pollutants COD | GB11914-1989 |
| Total nitrogen | GB11894-1989 |
| Total phosphorus | GB11893-1989 |
| Pb | GB7475-1987 |
| Fe | GB11911-1989 |

The results of water purification effect test for porous asphalt pavement specimens in embodiments 1-5 and comparative embodiments 1-3 of the present disclosure were shown in Table 5:

TABLE 5

| | Results of water purification effect test | | | | | | | |
|---|---|---|---|---|---|---|---|---|
| Purification rate | | Embodiment 1 | Embodiment 2 | Embodiment 3 | Embodiment 4 | Embodiment 5 | Comparative embodiment 1 | Comparative embodiment 2 | Comparative embodiment 3 |
| Suspended matter (SS)/% | | 56.8 | 57.5 | 58.6 | 54.9 | 55.2 | 22.5 | 21.6 | 34.2 |
| Heavy metal/% | Iron (Fe) | 44.7 | 45.5 | 45.6 | 46.1 | 44.9 | 17.6 | 15.8 | 22.8 |
| | Lead (Pb) | 36.6 | 36.9 | 37.2 | 38.1 | 34.3 | 9.6 | 8.1 | 12.5 |
| Biochemical pollutants/% | Chemical oxygen demand (COD) | 31.0 | 31.6 | 31.7 | 30.9 | 30.5 | 12.9 | 8.6 | 14.6 |
| | Total phosphorus (TP) | 50.8 | 51.0 | 52.1 | 49.9 | 50.4 | 7.4 | 5.2 | 13.6 |
| | Total nitrogen (TN) | 37.9 | 36.8 | 35.6 | 38.5 | 37.2 | 10.5 | 8.7 | 11.9 |

As can be known from Table 5 through comparison, the values of purification effects of various pollutants in embodiments 1-5 are greatly enhanced relative to those in comparative embodiments 1-3. It can be seen that, compared with comparative embodiments 1-3 added with conventional limestone mineral powder, fly ash, and diatomite respectively, the present disclosure shows excellent purification effects on suspended solids, heavy metal iron, heavy metal lead, ammonia nitrogen pollutants, phosphorus pollutants and biochemical pollutants COD, especially showing obvious purification effects on total phosphorus, total nitrogen and metallic lead pollutants.

2. Tests on Mechanical Properties:

(1) Anti-dispersion performance: A standard dispersion test was employed for evaluation. After 300 times of rotational dispersion following the specifications, multiple rotational dispersion tests of 500, 700, 900, 1100 and 1300 times were continued. Dispersion rate is the ratio of the mass of specimen after dispersion to the mass of original specimen, as shown in FIG. 1. In the new version of Technical Specifications for Design and Construction of Drainage Asphalt Pavement (JTG/T 3350-03-2020), it requires that the dispersion rate of the specimen should not be higher than 15% after 300 times of rotational dispersion test. The dispersion losses in comparative embodiment 3 and embodiment 1 were both less than the loss rate of 15% as required in JTG/T 3350-03-2020 specification. However, with the increase of dispersion times, the anti-dispersion performance in embodiment 1 was significantly superior to that in comparative embodiment 3.

Figure 2:
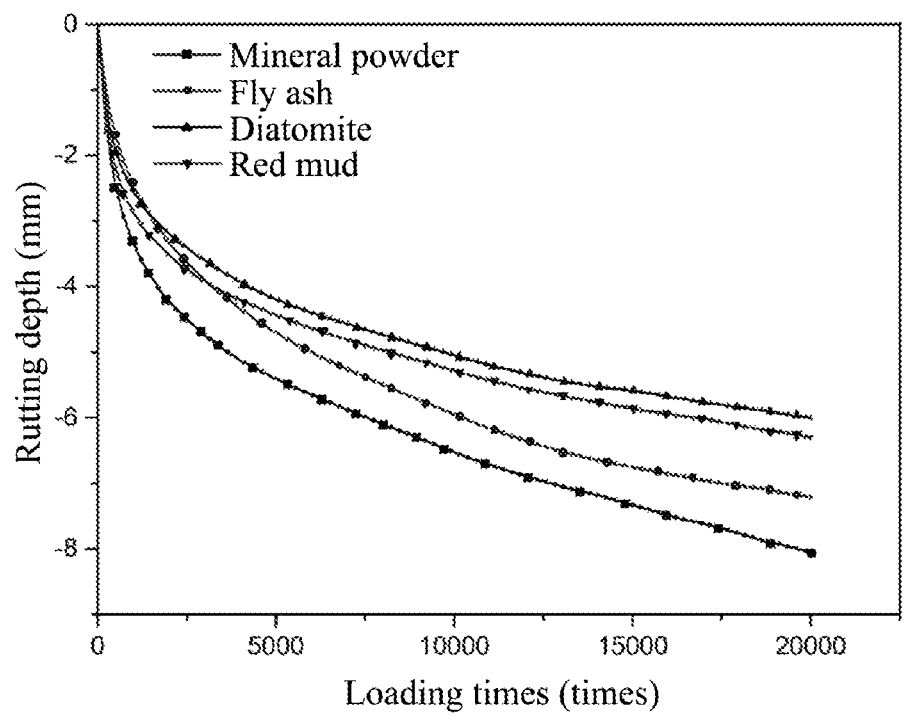
FIG. 2 shows the Hamburg rutting test results of the porous asphalt pavement materials in embodiment 1 and comparative embodiments 1-3 of the present disclosure.
Figure 3:
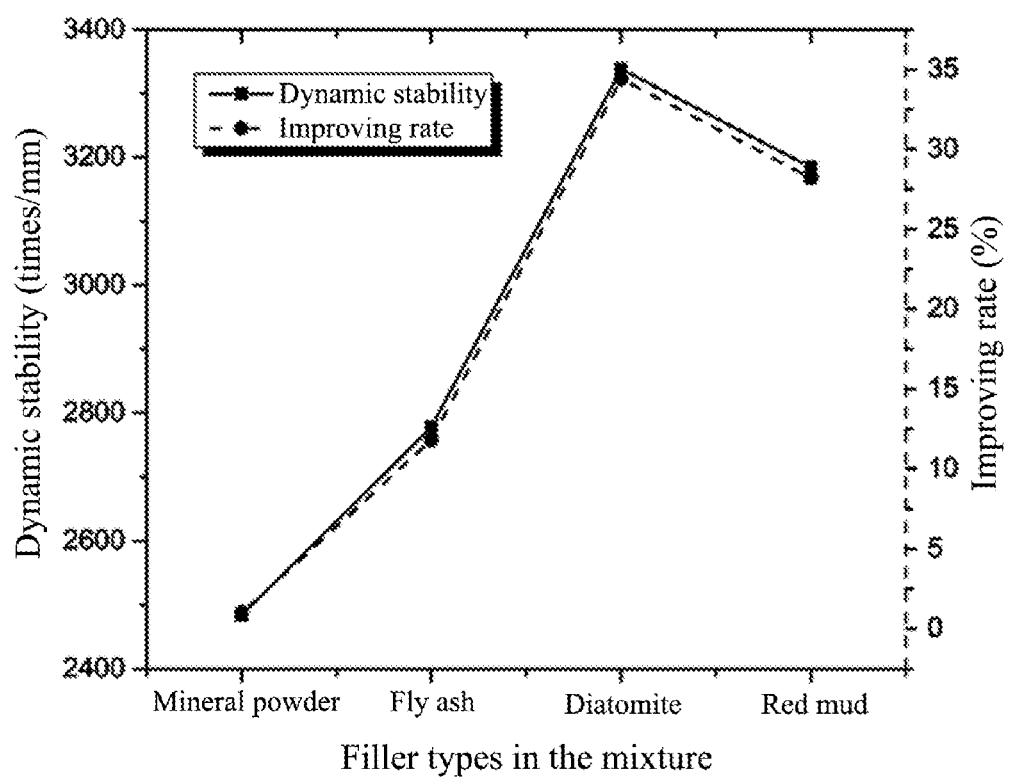
FIG. 3 shows the results of the improving rate of dynamic stability analyzed by the Hamburg rutting test of the porous asphalt pavement materials in embodiment 1 and comparative embodiments 1-3 of the present disclosure.

(2) Anti-rutting performance: A Hamburg rutting test was employed for evaluation. The Hamburg rutting test was performed in a water bath at a high temperature of 50° C., and the condition at which the test was determined to be stopped was that the specimen produced ruts of 20 mm or had been loaded for 20,000 times, with the rutting depth changes shown in FIG. 2. Since in this test, the rutting deformation of 20 mm was not reached at 20,000 times of loading, so in order to distinguish the comprehensive resistance to rutting and water damage of the four kinds of porous asphalt pavement specimens from embodiment 1 and comparative embodiments 1-3 under high temperature water bath conditions, this experiment proposed a method as below: the loading times at the end of the test were taken as the failure times of the test, and the ratio of the loading times at the end of the test (20,000 times) to the final rutting depth (loading times/rutting depth) was used to calculate the loading times required for each mm of the rutting depth during the whole loading process of 20,000 times, i.e., dynamic stability, which can be used to evaluate the anti-rutting performance under high temperature conditions quantitatively, with the calculation results shown in FIG. 3.

Figure 4A:
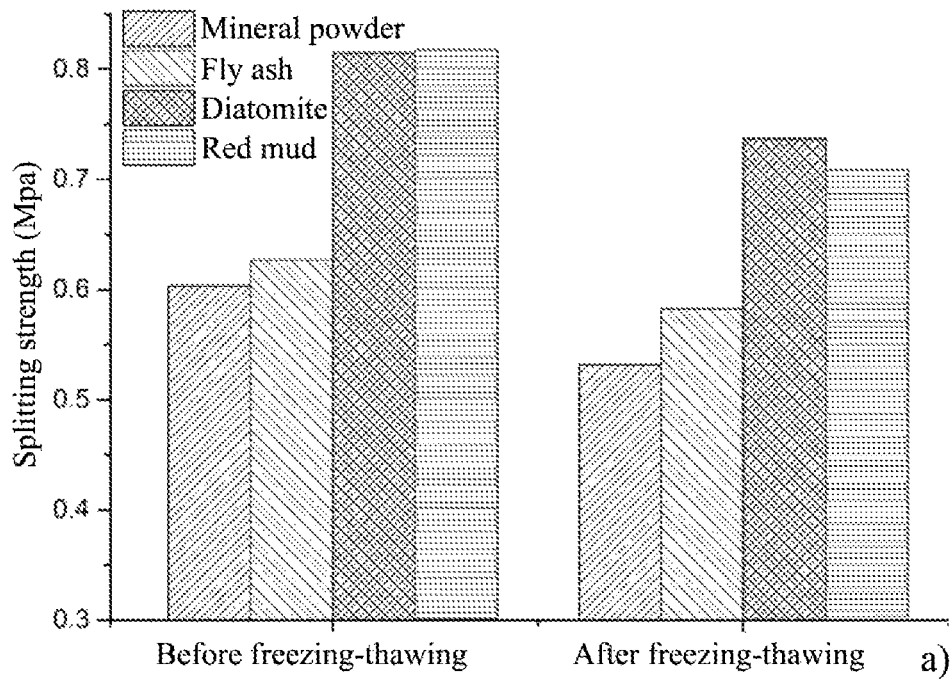
FIGS. 4(a)-4(b) show the freezing-thawing stability experimental results of the porous asphalt pavement materials in embodiment 1 and comparative embodiments 1-3 of the present disclosure.
Figure 4B:
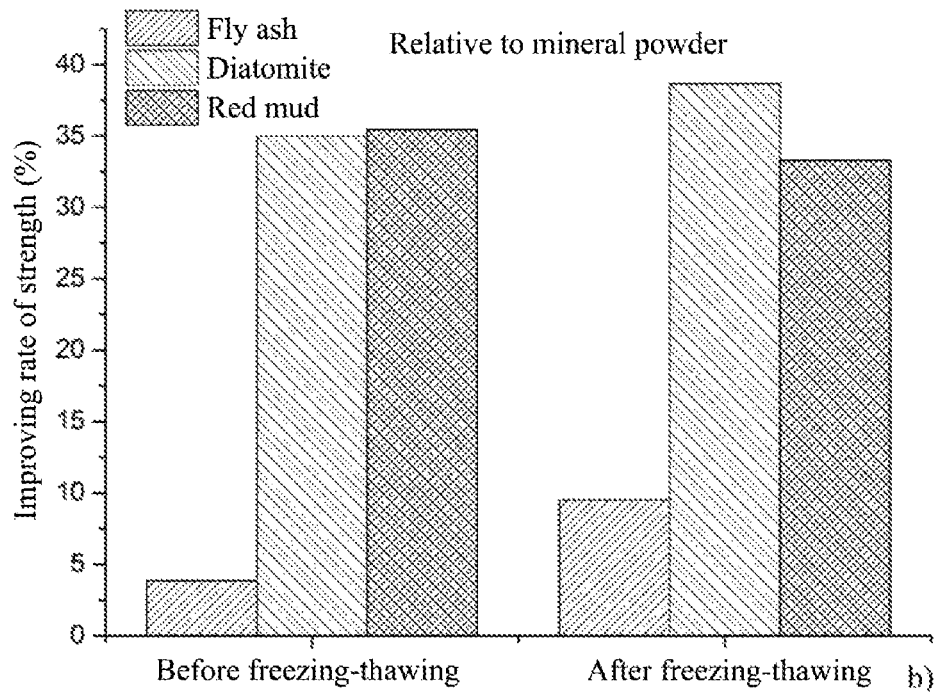

(3) Freezing-thawing stability: A freezing-thawing splitting test was employed for evaluation. The strength will be reduced to some extent after freezing and thawing. FIG. 4(a) shows the splitting strength results before and after freezing-thawing of the porous asphalt pavement specimens prepared from four different fillers in embodiment 1 and comparative embodiments 1-3. As can be known from FIG. 4(a), before and after freezing-thawing, the splitting strength of the porous asphalt mixture can be significantly improved in embodiment 1.

Figure 5A:
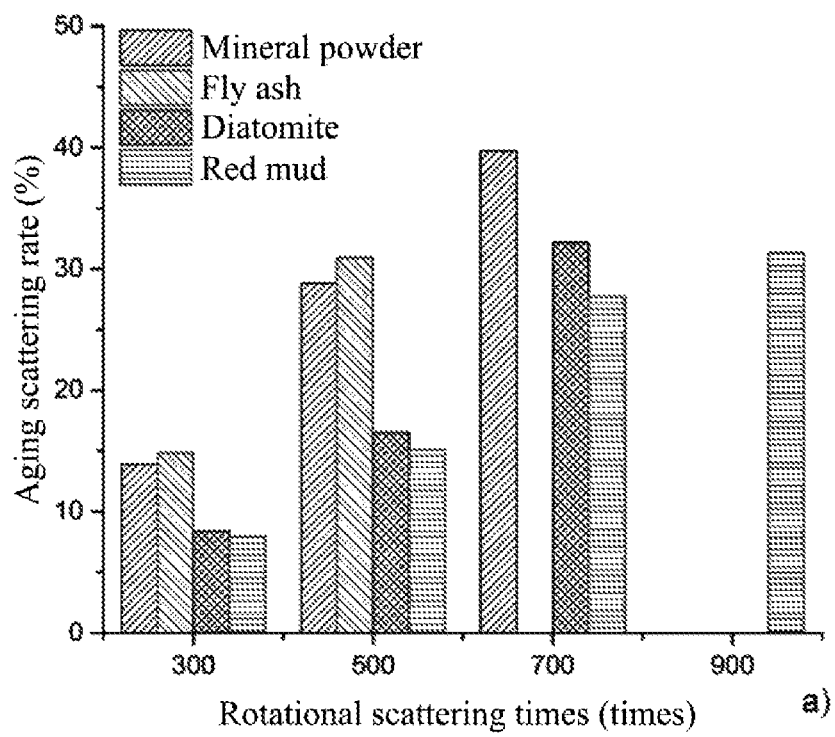
FIGS. 5(a)-5(b) show the aging dispersion test results of the porous asphalt pavement materials in embodiment 1 and comparative embodiments 1-3 of the present disclosure.
Figure 5B:
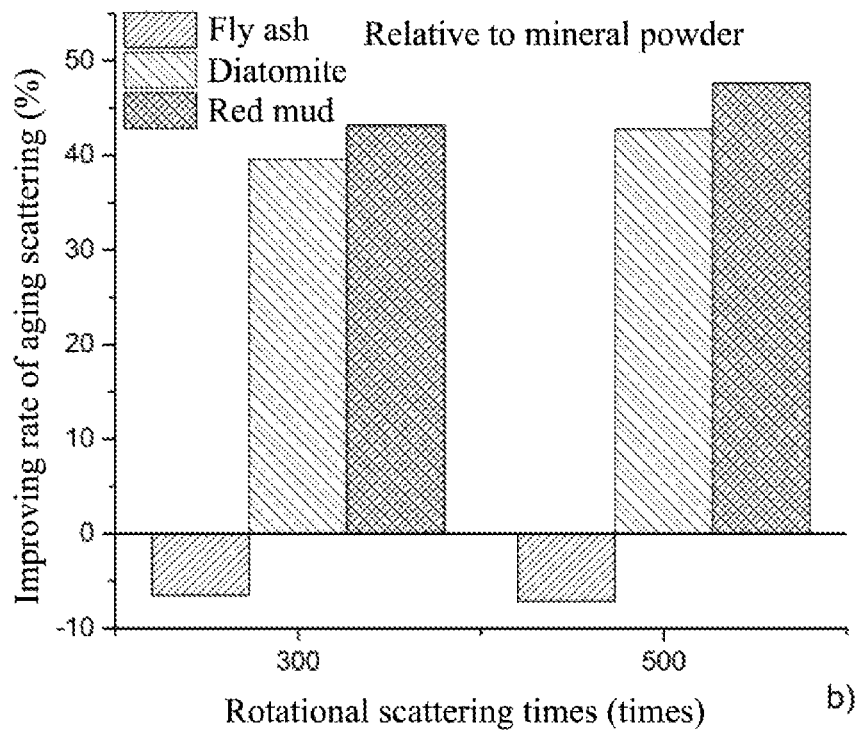

(4) Anti-aging performance: An aging dispersion test was employed for evaluation. The dispersion test was carried out after a long-term indoor aging, the dispersion loss rate of the porous asphalt pavement was calculated, and the first occurrence of 30% dispersion loss rate was taken as the criterion for stopping the test. As shown in FIG. 5(a), long-term aging effect can increase the aging dispersion loss rate of the specimens to a certain extent, that is to say, the anti-aging performance was reduced. After long-term aging, the specimen prepared from fly ash in comparative embodiment 2 showed the worst anti-aging performance, and only in embodiment 1, after rational dispersion for 900 times, an aging dispersion loss rate of 30% occurred for the first time, indicating that the porous asphalt pavement specimen prepared in embodiment 1 with red mud as the filler had the best anti-aging performance.

Figure 6:
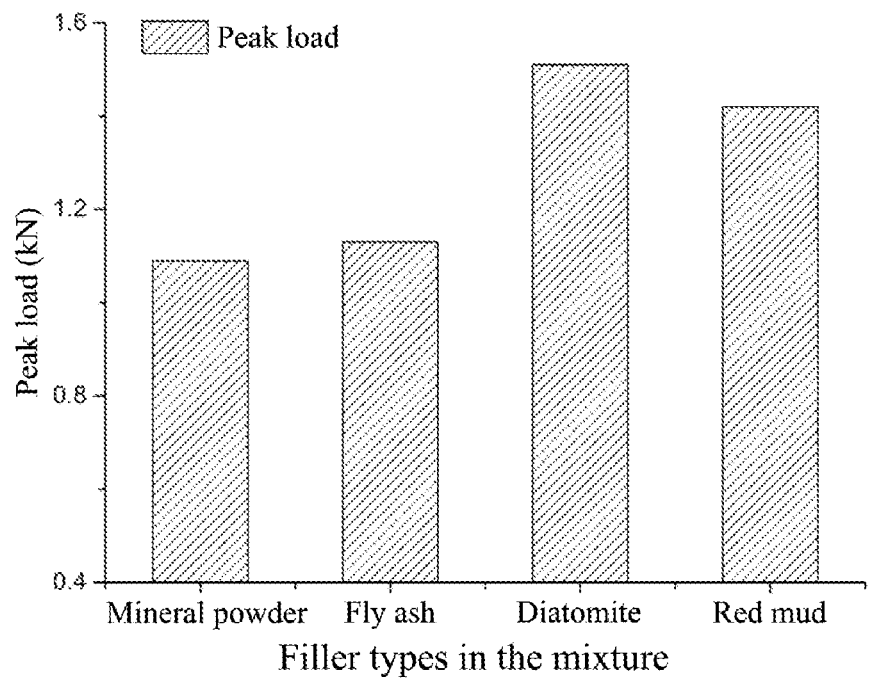
FIG. 6 shows the peak load test results of the semi-circular bending test of the porous asphalt pavement materials in embodiment 1 and comparative embodiments 1-3 of the present disclosure.
Figure 7:
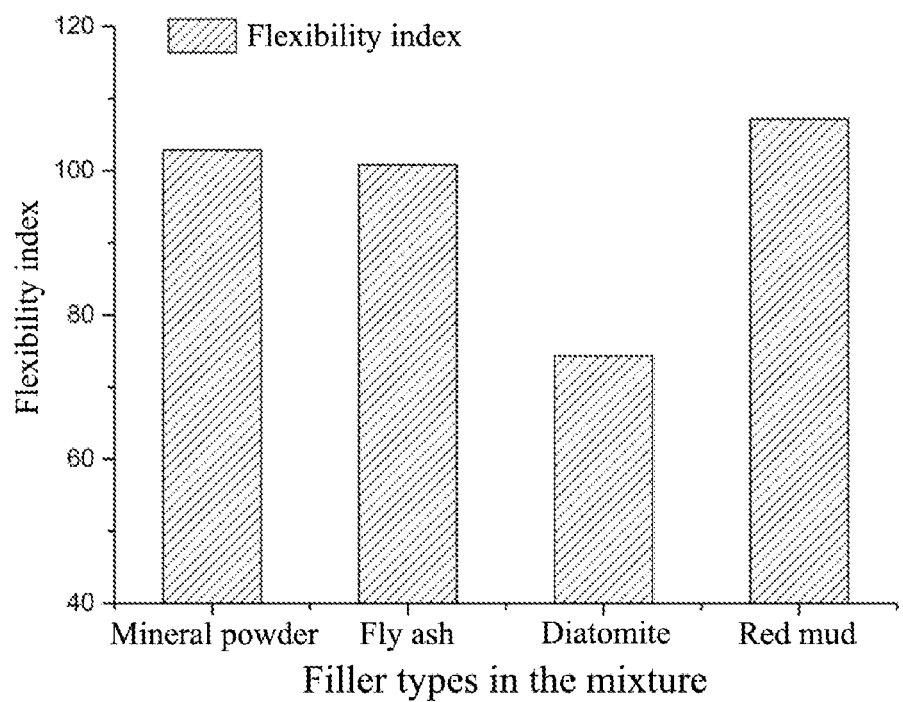
FIG. 7 shows the calculation results of the flexibility index of the semi-circular bending test of the porous asphalt pavement materials in embodiment 1 and comparative embodiments 1-3 of the present disclosure.

(5) Cracking resistance: A semi-circular bending test (SCB) widely applied at present was employed for evaluation. FIG. 6 shows the peak loads of the porous asphalt pavement specimens prepared from four different fillers in embodiment 1 and comparative embodiments 1-3 in the SCB test, from which it can be found that the cracking resistance of the porous asphalt mixture in embodiment 1 in the semi-circular bending test was significantly improved compared to comparative embodiment 1, this was mainly caused by the anchoring and hardening effects of red mud on asphalt. The flexibility index FI was calculated and analyzed according to the test results, as shown in FIG. 7. Traditional mineral powder, fly ash and red mud have similar flexibility indexes, while diatomite, as filler, significantly reduced the flexibility index of the mixture.

The test results of mechanical properties of the porous asphalt pavement specimens in embodiments 1-5 and comparative embodiments 1-3 of the present disclosure were shown in Table 6 as below:

TABLE 6

Test results of mechanical properties

| Mechanical property indicators | | Embodiment 1 | Embodiment 2 | Embodiment 3 | Embodiment 4 | Embodiment 5 | Comparative embodiment 1 | Comparative embodiment 2 | Comparative embodiment 3 |
|---|---|---|---|---|---|---|---|---|---|
| Dispersion rate (900 times, %) | | 23.2 | 22.5 | 24.3 | 25.3 | 23.6 | 26.3 | 25.3 | 19.9 |
| Rutting depth (20,000 times, mm) | | −6.2 | −5.9 | −6.3 | −6.0 | −6.5 | −8.1 | −7.5 | −6.2 |
| Dynamic stability (times/mm) | | 3180 | 3150 | 3100 | 3200 | 3210 | 2470 | 2780 | 3340 |
| Anti-splitting strength (MPa) | Before freezing-thawing | 0.81 | 0.79 | 0.82 | 0.83 | 0.81 | 0.61 | 0.63 | 0.80 |
| | After freezing-thawing | 0.73 | 0.72 | 0.72 | 0.71 | 0.73 | 0.52 | 0.58 | 0.74 |
| Aging dispersion rate (300 times, %) | | 7.5 | 7.2 | 6.9 | 7.4 | 7.1 | 14.4 | 15.2 | 8.3 |
| Peak loads in semi-circular bending test (kN) | | 1.42 | 1.48 | 1.45 | 1.40 | 1.43 | 1.10 | 1.15 | 1.50 |
| Flexibility index | | 106 | 109 | 111 | 110 | 108 | 102 | 100 | 74 |

In summary, compared with comparative embodiment 3 added with diatomite, the porous asphalt pavement specimens added with red mud in embodiments 1-5 of the present disclosure had significantly improved anti-dispersion performance and anti-aging performance, and the anti-rutting performance, freezing-thawing stability, dynamic stability and cracking resistance stayed at similar levels. Compared with comparative embodiments 1 and 2 added with mineral powder and fly ash respectively, the anti-dispersion performance, anti-rutting performance, freezing-thawing stability, anti-aging performance and cracking resistance of the porous asphalt pavement specimens added with red mud in embodiments 1-5 of the present disclosure were all improved significantly.

It can be known from the above test results that, the asphalt modified with red mud for porous pavement material as provided in the present disclosure meets the requirements of mechanical properties specified in the standard, and it can purify runoff rainwater and improve mechanical properties of itself. Therefore, the asphalt modified with red mud for porous pavement material of the present disclosure can be applied in the purification of runoff pollutants on roads in actual environment, which can improve the water purification effect of the porous asphalt pavement directly and effectively, thus having great significance to alleviate the urban non-point pollution, and can improve the mechanical properties of porous asphalt pavement materials, thereby ensuring the pavement performance of roads.

The foregoing is only preferable implementation of the present disclosure. It should be noted to persons with ordinary skills in the art that several improvements and modifications can be made without deviating from the principle of the present disclosure, which are also considered as the protection scope of the present disclosure.

What is claimed is:

1. Asphalt modified with red mud for porous pavement material, consisting of asphalt, red mud and aggregate; a mass ratio of asphalt to red mud is 1:(0.10-0.15), and a mass ratio of a total mass of asphalt and red mud to aggregate is (0.08-0.12):1, wherein a gradation way of the aggregate is gap gradation, and based on a mass percentage of a total screening of the aggregate, an aggregate passing rate corresponding to a screen size of 0.075 mm is 4-6%, an aggregate passing rate corresponding to a screen size of 0.15 mm is 6-7%, an aggregate passing rate corresponding to a screen size of 0.3 mm is 7.5-8.5%, an aggregate passing rate corresponding to a screen size of 0.6 mm is 10-11%, an aggregate passing rate corresponding to a screen size of 1.18 mm is 12-13%, an aggregate passing rate corresponding to a screen size of 2.36 mm is 14-15%, an aggregate passing rate corresponding to a screen size of 4.75 mm is 19-20%, an aggregate passing rate corresponding to a screen size of 9.5 mm is 73-75%, an aggregate passing rate corresponding to a screen size of 13.2 mm is 95-96%, and an aggregate passing rate corresponding to a screen size of 16 mm is 100%.

2. The asphalt modified with red mud for porous pavement material according to claim 1, wherein, the asphalt is high-viscosity asphalt, and the viscosity of the high-viscosity asphalt is greater than 20,000 Pa·s.

3. The asphalt modified with red mud for porous pavement material according to claim 1, wherein, the red mud has a particle size of 1-75 μm.

4. The asphalt modified with red mud for porous pavement material according to claim 1, wherein, the red mud has a density of 2.70-2.98 g/cm³.

5. The asphalt modified with red mud for porous pavement material according to claim 3, wherein, the red mud has a density of 2.70-2.98 g/cm³.

6. The asphalt modified with red mud for porous pavement material according to claim 1, wherein, the red mud has a plasticity index of 17-30.

7. The asphalt modified with red mud for porous pavement material according to claim 3, wherein, the red mud has a plasticity index of 17-30.

8. The asphalt modified with red mud for porous pavement material according to claim 1, wherein, the red mud comprises the following mass percentages of oxide components: $Al_2O_3$ 21-39%, $Fe_2O_3$ 10-21%, $TiO_2$ 2-5%, $SiO_2$ 16-29%, CaO 13-21% and $Na_2O$ 5-13%.

9. The asphalt modified with red mud for porous pavement material according to claim 3, wherein, the red mud comprises the following mass percentages of oxide components: $Al_2O_3$ 21-39%, $Fe_2O_3$ 10-21%, $TiO_2$ 2-5%, $SiO_2$ 16-29%, CaO 13-21% and $Na_2O$ 5-13%.

10. The asphalt modified with red mud for porous pavement material according to claim 1, wherein, the aggregate is basalt.

11. The method of using the asphalt modified with red mud for porous pavement material according to claim 1, wherein, comprising: paving, compacting and resting the asphalt modified with red mud for porous pavement material in turn, to construct the red mud modified porous asphalt pavement material.

12. The method of using the asphalt modified with red mud for porous pavement material according to claim 11, wherein, the asphalt is high-viscosity asphalt, and the viscosity of the high-viscosity asphalt is greater than 20,000 Pa s.

13. The method of using the asphalt modified with red mud for porous pavement material according to claim 11, wherein, the red mud has a particle size of 1-75 μm.

14. The method of using the asphalt modified with red mud for porous pavement material according to claim 11, wherein, the red mud has a density 2.70-2.98 g/cm³.

15. The method of using the asphalt modified with red mud for porous pavement material according to claim 11, wherein, the red mud has a plasticity index of 17-30.

16. The method of using the asphalt modified with red mud for porous pavement material according to claim 11, wherein, the red mud comprises the following mass percentages of oxide components: $Al_2O_3$ 21-39%, $Fe_2O_3$ 10-21%, $TiO_2$ 2-5%, $SiO_2$ 16-29%, CaO 13-21% and $Na_2O$ 5-13%.

17. The method of using the asphalt modified with red mud for porous pavement material according to claim 11, wherein, the aggregate is basalt.

18. The method of using the asphalt modified with red mud for porous pavement material according to claim 11, wherein, a rest period is 4-12 h.

* * * * *